May 12, 1942. E. T. PETERSON 2,282,673
GARDEN TOOL
Filed Aug. 29, 1940
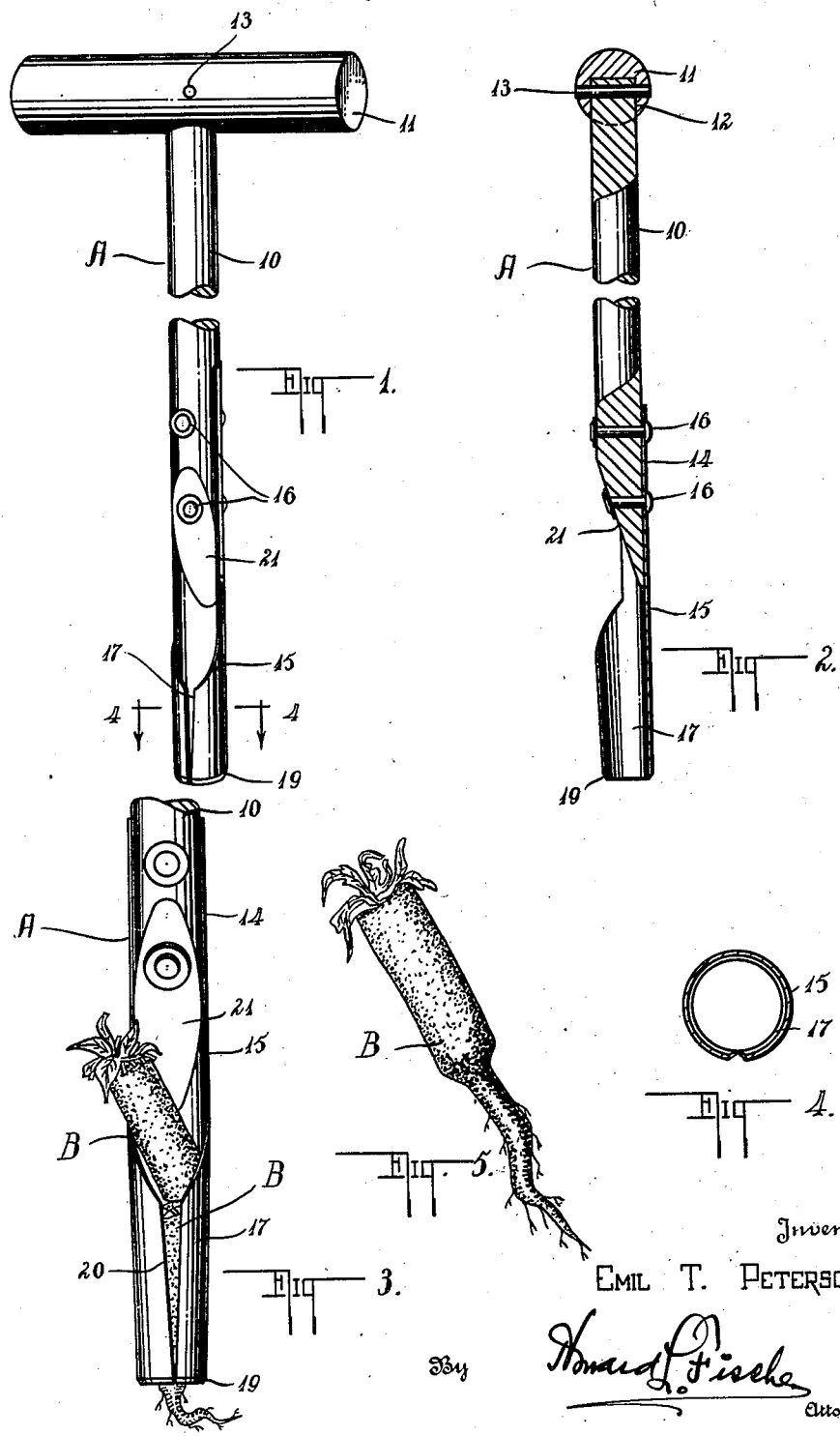
Inventor
EMIL T. PETERSON
By Howard L. Fischer
Attorney Patented May 12, 1942

2,282,673

UNITED STATES PATENT OFFICE 2,282,673

GARDEN TOOL

Emil T. Peterson, St. Paul, Minn.

Application August 29, 1940, Serial No. 354,685

1 Claim. (Cl. 294—50.7)

My invention relates to an improvement in garden tool which may be used in digging dandelions or weeds or for other useful purposes.

Many types of devices have been used for digging weeds such as dandelions and the like. Some of these devices comprise forks which extend into the ground adjacent the weed and cut off the root thereof beneath the surface of the ground. Other devices are designed to catch the head of the weed and to pull the same out. While these devices operate effectively for their designed purpose, it is true that in most cases the root of the weed is cut or broken off in the ground. At least a part of the root then remains in the ground and with many types of weeds the root will continue to grow and a new weed will be found where the old one has been removed.

It is the object of the present invention to provide a device which will dig out weeds, such as dandelions and the like, in a manner to remove the entire weed and all of the roots of the same. This I accomplish through the use of a substantially tubular element which may be forced into the ground about the root of the weed and which when removed will remove a cylindrical slug of earth together with the weed encased therein. As the ground beneath the surface is usually softer than the ground near the surface, the small ends of the roots of the weed will readily pull through this relatively soft earth and will be removed, together with the body of the weed root even though the tool is not pushed down sufficiently to encompass the extreme lower end of the root.

It is a purpose of my invention to provide a garden tool having a substantially cylindrical slightly tapered end, designed to extend into the ground and to contain a slug of ground enclosed by the substantially cylindrical end of the tool. The shape of the tool is such that this slug will be retained within the end of the tool as the same is pulled upwardly, thus removing a substantially cylindrical slug of earth from the ground. Thus my tool may be used for digging samples of dirt, making air holes for plants, holing out ants, and for making holes for planting flowers. All of these features are readily accomplished through the use of my tool.

It is a feature of my invention to provide a means of ejecting the slugs of earth automatically during the operation of the tool. As the tool is forced downwardly into the ground a slug of earth is enclosed therein. This earth remains enclosed within the substantially cylindrical end of the tool until the tool is again forced into the ground. This downward movement of the tool into the ground acts to force a second slug of earth into the tool, pushing the previously formed slug of earth out through an ejecting space above the operating end of the tool.

It is a feature of my invention to provide a dandelion digging device, or the like, having a slightly tapered tubular end thereupon. The lower end of the tool is of slightly smaller diameter than the tubular end at a point above the lower end so that as the slug of earth is formed by the lower cutting edge of the tool, this slug passes into the slightly tapered tubular end and is permitted to expand sufficiently so that it will not again pass out through the bottom of the tubular end as the tool is removed. The taper of the end of the tool and the friction against the slugs of dirt forced thereinto, permits the slug of dirt to be removed with the tool without any further elements to accomplish this result.

It is a further purpose of my invention to provide a tool with a tapered substantially tubular lower end which is attached to an operating handle. The substantially tubular lower end is cut away along one side thereof to permit the slugs of dirt to be ejected from the tubular end and the lower end of the handle is so shaped as to direct the slugs of earth out this ejecting space. Thus as the tool is operated by successively forcing the same into the ground, the slugs are successively guided out through the ejection opening above the substantially tubular lower operating end.

These and other objects and novel features of my invention will be more clearly and fully set forth in the following specification and claim.

In the drawing forming a part of my specification:

Figure 1 is a perspective view of my tool.

Figure 2 is a longitudinal section through the tool shown in Figure 1.

Figure 3 is an enlarged view of the operating end of the tool.

Figure 4 is a cross-sectional view, the position of the view being indicated by the line 4—4 of Figure 1.

Figure 5 is a perspective view of a slug which has been removed from the ground by the tool.

The garden tool A comprises a handle element 10 to the top of which is preferably secured a cross handle 11. The cross handle 11 is drilled to provide a recess 12 for accommodating the upper end of the handle 10 and a pin such as 13 is inserted through the handle 10 and cross handle 11 to hold these two elements in fixed relation.

To the lower extremity of the handle 10 I secure a trough-shaped end 14 of the operating head 15. The trough-shaped end 14 is designed to fit the curvature of the handle 10 and is secured to the handle 10 by means of rivets 16 or other suitable means. As will be noted in Figures 1, 2 and 3 of the drawing, the lower end of the handle 10 is beveled from the forward surface thereof to the base of the trough or channel-shaped end 14 of the operating head 15. This bevel acts to direct slugs of dirt passing through the operating head out through the open side of the trough-shaped end 14. The head 15 is provided with a substantially tubular lower end 17 which terminates in a cutting edge 19. As the operating head 15 is ordinarily formed of a single strip of material, the material is rolled into tubular form and the edges of the material abut at the lower extremity of the tubular head. Above the cutting edge 19, however, the breach between the sides of the cutting head widens to form a substantially V-shaped groove 20 in the tubular end 17.

The manner in which the tool is operated is believed obvious from an examination of the drawing and from the foregoing description. The tube is placed with the tubular end 17 of the operating head 15 encircling the root of a dandelion or weed to be extracted. The head is then forced downwardly into the ground, the cutting edge 19 cutting a cylindrical slug of dirt from the ground which contains the main root of the dandelion or other weed. When the tool has been forced into the ground sufficiently to permit withdrawal of the weed in its entirety, the handle 10 is pulled upwardly by means of the cross handle 11. As the slug of dirt indicated by the letter B in the drawing is permitted to expand slightly after passing through the tubular lower end of the head 15 because of the taper in this end, the slug will not drop downwardly through the open lower end of the tool and the friction upon the slug B is sufficient to permit any portion of the root not enclosed by the tool to be pulled from the ground. Thus when the tool A is removed from the ground, it will be found to contain a slug of dirt with perhaps a portion of the root within the slug depending from the lower end of the tool.

The slug is permitted to remain within the tubular end 17 and another dandelion or weed is then removed. By forcing the handle 10 downwardly the tubular end 17 of the operating head 15 is again forced into the earth, the cutting edge 19 cutting a new cylindrical slug of earth. As the tool is forced into the ground, the first slug formed is urged upwardly in the tubular head and above this tubular portion. The slug engages the beveled end 21 of the handle 10 and is guided thereby out through the open side of the operating head 15 above the tubular lower end 17.

It will be seen that with my garden tool it is possible to remove dandelions and other weeds in their entirety from the ground and that my tool does not merely cut off the root and leave the same in the ground to continue to grow. Furthermore, my tool may be used for removing a sample slug of earth or for disturbing the ground in ant hills and the like.

In accordance with the patent statutes I have described the principles of construction and operation of my garden tool and while I have endeavored to set forth the best embodiments thereof, I desire to have it understood that these are only illustrative of a means of carrying out my invention and that obvious changes may be made within the scope of the following claim without departing from the spirit of my invention.

I claim:

A weed extractor comprising a handle, an inclined end thereon, a cutting head comprising a tapered tubular element, and a trough-shaped projecting portion thereon, a pair of attaching means extending through said projecting portion and through said handle securing said projecting portion to said handle so that said inclined end will guide weeds out of said channel, one of said securing means extending through said inclined end and projecting from the surface thereof, and a cutting edge on the smallest diameter end of said tubular member, said tubular member having a V-shaped longitudinally extending slot extending throughout the length of said tubular member, said slot being closed at the cutting edge and increasing in width throughout its length.

EMIL T. PETERSON.